Apr. 24, 1923.
I. W. BROGGER
1,452,591
ELECTRICAL MEASURING INSTRUMENT
Filed April 26, 1919
2 Sheets-Sheet 1

INVENTOR:
Ivar W. Brogger,
BY
Russell M. Everett,
ATTORNEY.

Apr. 24, 1923.  1,452,591
I. W. BROGGER
ELECTRICAL MEASURING INSTRUMENT
Filed April 26, 1919   2 Sheets-Sheet 2
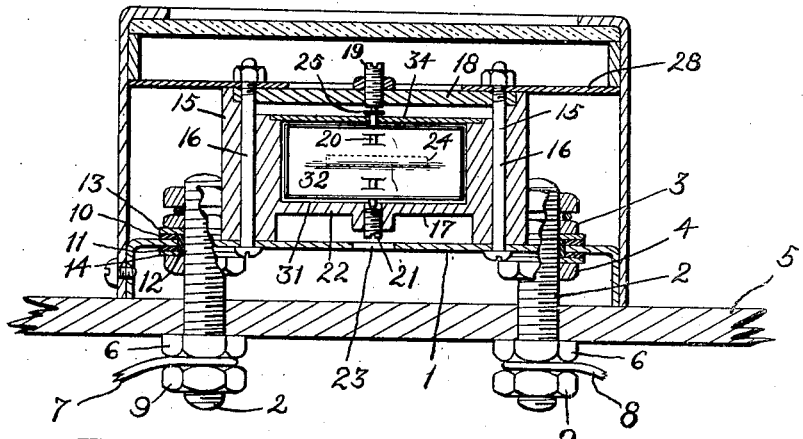
Fig. 4.
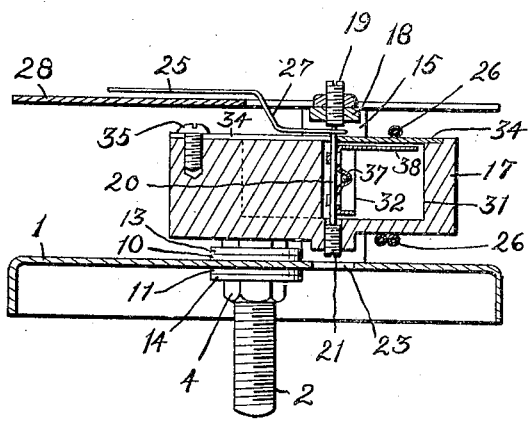
Fig. 5.
Fig. 6.
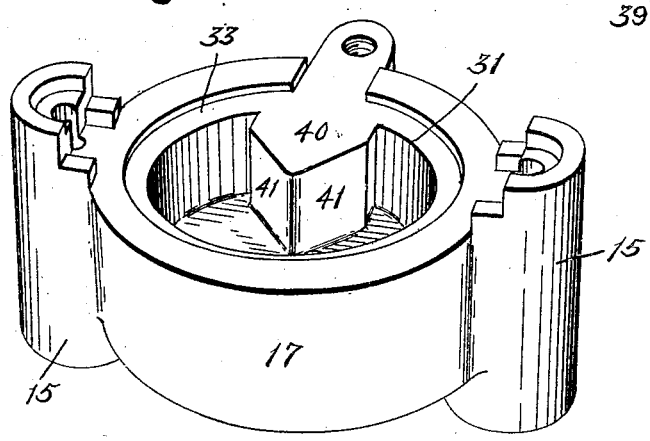
Fig. 7.
INVENTOR:
Ivar W. Brogger,
BY
Russell M. Everett
ATTORNEY.

Patented Apr. 24, 1923.

1,452,591

UNITED STATES PATENT OFFICE.

IVAR W. BROGGER, OF NEWARK, NEW JERSEY, ASSIGNOR TO STANDARD ELECTRIC MANUFACTURING COMPANY, A CORPORATION OF NEW JERSEY.

ELECTRICAL MEASURING INSTRUMENT.

Application filed April 26, 1919. Serial No. 292,995.

*To all whom it may concern:*

Be it known that I, IVAR W. BROGGER, a subject of the Kingdom of Norway, residing at Newark, in the county of Essex and State of New Jersey, have invented new and useful Improvements in Electrical Measuring Instruments, of which the following is a specification.

This invention relates especially to current measuring instruments of the class shown in my application, Serial No. 292,994, filed herewith and the objects of the invention are to simplify the construction of such instruments and at the same time secure reliability and durability; to secure a tendency to hold the moving bar in zero position by means of a bridge of magnetic material for supporting one end of the pivot staff; to utilize a bar magnet for such a bridge; to provide a magnet and keeper therefor in the plane of the pivot staff and moving member in zero position, for tending to hold said moving member in zero position, one of which parts supports an end of the pivot staff; to provide a keeper for a magnet employed as a bridge to support one end of the pivot staff; to utilize for such keeper the means for supporting the magnet as a bridge; to provide a base plate to which such a magnet employed as a bridge is bolted, the bolts and base plate forming a keeper; to combine with such a magnetic bridge a damping box which is utilized to support the same; to provide a looped field coil and a damping box projecting into the same with means for securing each of them independently of the other; to thus enable either the damping box or field coil to be removed and replaced without disturbing the other, and to obtain other advantages and results as may be brought out in the following description.

Referring to the accompanying drawings, in which like numerals of reference indicate the same parts throughout the several views, Figure 1 is a plan of an electrical measuring instrument of my improved construction with the casing removed;

Figure 4 is a section on line 4—4, Fig. 1;

Figure 5 is a section at right angles to the one shown in Fig. 4, taken on line 5—5, Fig. 3;

Figure 6 is a perspective view of the damping box, and

Figure 7 is a perspective view of the damping vane.

Figure 1:
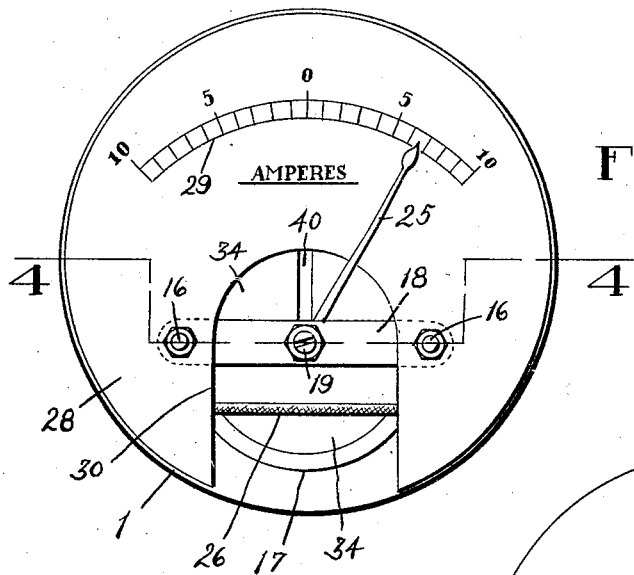

In said drawings, 1 indicates a suitable base plate for my improved instrument mounted upon posts 2, 2 which are shown extending through holes in the base plate and each receiving on opposite sides of said base nuts 3, 4 which clamp the base plate between themselves on the upper ends of the posts. The other ends of these posts are shown extending through the board 5 upon which the instrument is to be mounted and receiving on the oposite side thereof nuts 6, 6. I have shown the current entering and leaving the instrument through these posts 2, 2 by means of wires 7, 8 secured by binding nuts 9, 9, and therefore the posts 2, 2 are each insulated from the base plate 1 by means of washers 10, 11 and a bushing 12 between metal washers 13, 14 next the nuts 3 and 4 of each post. It will be understood that any suitable form of base plate and mounting means therefor can be employed, and that which I have shown is for purposes of illustration only.

Upon the base plate 1 are spaced standards 15, 15 shown secured to the base plate by bolts 16, 16, although any other suitable means might be employed. I have also shown said standards integral with a damping box 17 in which the moving member is preferably mounted as hereinafter more fully described, although I desire it understood that the damping box could be dispensed with and the moving member mounted in substantially the same position by any other suitable means which would occur to one skilled in this art.

Because of forming a portion of the damping box 17, the standards 15 herein shown are of non-magnetic metal, but the bolts 16, 16 are of iron or other magnetic material and serve to clamp upon the tops of the standards a bar magnet 18. The base plate 1 being preferably of iron or magnetic material it will thus be seen that with the bolts 16, 16, a keeper is provided for the magnet 18, so as to prevent its magnetism from being lost and thus lengthen its life. While this is desirable, it will of course be understood that some of the advantages of my invention could be secured without any such keeper means.

The magnet 18 carries intermediate the standards 15, 15 a bearing screw 19 for the upper end of the pivot staff 20 of the moving member, and said pivot staff is similarly mounted at its lower end in a bearing screw 21 in the bottom or floor 22 of the damping box, an aperture 23 being provided in the base plate 1 to allow access to said screw 21. Obviously in event of no damping box being employed the bearing screw 21 could be mounted directly in the base plate 1. The moving member comprises a bar 24 fast with respect to the pivot staff 20 in a position substantially parallel to the magnet 18, and preferably this bar 24 is a permanent magnet with its poles arranged opposite to those of the magnet 18 so that it tends to always lie parallel thereto. This tendency holds the index or pointer 25, which is fast to the upper end of the pivot staff, in zero position, and when a current to be measured passes through a field coil 26 having its ends connected to the posts 2, 2, said current can be measured by the deflection of the pointer 25. Preferably said pointer bends upward as at 27, see Figure 5, so as to overlie a dial plate 28 secured upon the tops of the standards 15 and having a scale 29 marked thereon, said dial plate being cut away at its middle portion 30 as shown.

Figure 2:
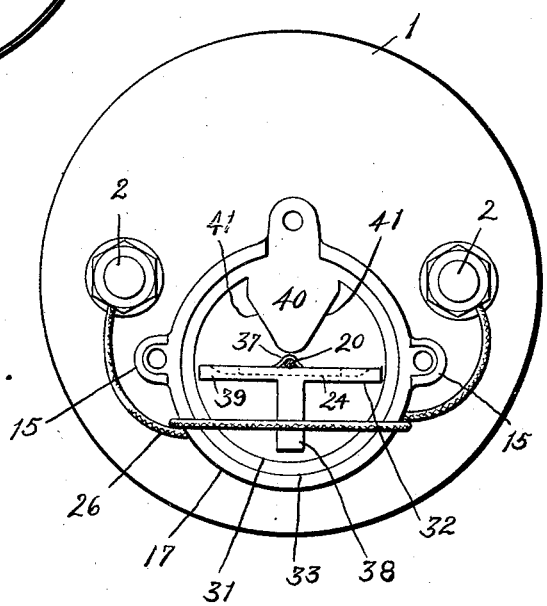
Figure 2 is a sectional view of the same on line 2—2, Fig. 4.
Figure 3:
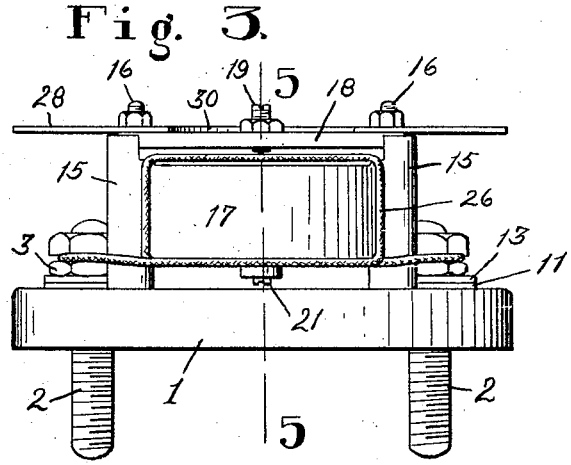
Figure 3 is a front elevation of the instrument as shown in Fig. 1.

The field coil 26 may in my improved construction consist of only a single turn or loop of wire, as shown, and is preferably arranged close to the moving member at the front of the instrument in upright edgewise position on the base plate 1 substantially parallel to the zero position of said moving member, as shown in Figure 2.

The construction thus described is very simple, and consequently durable, and it has been found to be very reliable in operation and free from liability to get out of order.

The damping box 17 which I prefer to employ is of non-magnetic material and provides a chamber 31 which is in general of cylindrical shape, the pivot staff 20 being in the axial line of said chamber. Upon said pivot staff and within the chamber of the damping box is mounted a damping vane 32 which extends substantially across the damping chamber and from top to bottom thereof, clearing the side walls, top and bottom only enough to allow the vane to swing with the necessary freedom as the pivot staff turns. Preferably the top of the damping chamber is closed by recessing as at 33 to receive a cover 34 held in place by a screw 35. The damping vane 32 I have shown made of sheet metal with a couple of loops 36 pressed out of itself to enable the pivot staff to pass through and be cemented or otherwise held against independent turning. Also longitudinally of itself and therefore at right angles to the pivot staff, said damping vane has a groove 37 which preferably terminates short of the ends of the vane and in which groove is cemented the bar 24. Preferably this bar 24 is arranged on the opposite side of the pivot staff from the pointer 25, as is also the damping vane 32, so as to balance said pointer, and a further balancing effect is secured by an extension 38 at the upper edge of the damping vane opposite the pointer 25. I have also shown the edges of the damping vane bent at right angles to form a flange 39, in order to increase the damping effect by offering greater resistance to the air enclosed in the damping box passing the vane, although it is not essential to flange said edges.

It will be understood that the bar 24 could be mounted on the pivot staff by any other suitable means in case no damping vanes were employed, but I prefer to use the damping vane and have therefore shown the combined construction. To secure the damping action, a rib 40 extends inwardly from the wall of the damping chamber, beneath the zero position of the needle or pointer and nearly to the pivot staff 20 and parts carried thereby, as clearly shown in Figures 2 and 5, and thus as the moving member swings one end or the other of the damping vane tends to compress the air in the damping chamber between itself and said rib, ensuring movement of the pointer or indicator to its deflected positions without undue oscillation at such positions. Preferably the sides of the rib 40 are beveled, as at 41, 41, at proper angles for the moving member to lie thereagainst as limits or stops at the extremities of its oscillation.

It will be noted that the field coil 26 extends around the front part of the damping box 17, in a chordal plane thereof so as to be parallel to the zero position of the moving member 24 and closely adjacent thereto so that said moving member receives the full benefit of the current passing through the field coil. A very compact structure is thus obtained by my invention, and one which will operate accurately and durably, since the field coil and damping box are secured to the base plate 1 by independent means so that either can be removed and replaced independent of or without disturbing the other.

Various detail modifications and changes may be made in manufacturing my improved instrument without departing from the spirit and scope of the invention, and I do not wish to be understood as limiting myself except as required by the following claims when construed in the light of the prior art.

Having thus described the invention, what I claim is:

1. In a current measuring instrument, the combination of a bar forming a bridge, a pivot staff mounted at one end in said bridge at its middle and a moving bar on said pivot staff adapted in zero position to lie parallel to said bridge bar with its ends equally distant from the ends of the bridge bar, both said bars being of magnetic material and one of them a magnet, whereby a tendency to hold the moving bar in zero position is secured.

2. In a current measuring instrument, the combination of a bar magnet forming a bridge, means for supporting at opposite ends of said bridge a pivot staff mounted at one end in said bridge at its middle, and a moving bar on said pivot staff adapted to be influenced by said bar magnet to lie parallel thereto in zero position.

3. In a current measuring instrument, the combination with a pivot staff, a moving bar on said pivot staff, and a field coil, of a stationary bar magnet in the plane of said pivot staff and the moving bar in zero position, and a stationary keeper for said bar magnet extending around the moving bar in said plane, one of said stationary parts supporting an end of the pivot staff.

4. In a current measuring instrument, the combination with a pivot staff, a moving bar on said pivot staff and a field coil, of a bar magnet in the plane of said pivot staff and the moving bar in zero position and supporting one end of said pivot staff, and a keeper for said bar magnet extending around the moving bar in said plane.

5. In a current measuring instrument, the combination of a bar magnet forming a bridge, means for holding the ends of said magnet in position and forming with the magnet a keeper, and a moving bar between said bar magnet and keeper adapted to lie in the same plane therewith in zero position.

6. In a current measuring instrument, the combination with a base plate, of a bar magnet forming a bridge substantially parallel to said base plate, means securing the ends of said bridge to the base plate and therewith forming a keeper for the magnet, and a moving bar between said bar magnet and keeper adapted to lie in the same plane therewith in zero position.

7. In a current measuring instrument, the combination with a damping box, of a bar forming a bridge across said damping box, a pivot staff mounted between said bridge and the bottom of the damping box, a damping vane on said pivot staff, and a moving bar also carried by said pivot staff and being in its zero position parallel to said bridge bar, both said bars being of magnetic material and one of them a magnet, whereby a tendency to hold the moving bar in zero position is secured.

8. In a current measuring instrument, the combination with a damping box, of a bar magnet forming a bridge across said damping box, a pivot staff mounted between said bridge and the bottom of the damping box, a damping vane on said pivot staff, and a moving bar also carried by said pivot staff and being in its zero position parallel to said bridge.

9. In a current measuring instrument, the combination of a damping box, a bar magnet forming a bridge for said damping box, a base plate, bolts through the ends of said bridge and the base plate securing the damping box thereto and forming a keeper for the magnet, a damping vane in said damping box, and a moving bar carried by said damping vane parallel in zero position to the bar magnet forming the bridge.

10. In a current measuring instrument, the combination of a base plate, a looped field coil, a damping box projecting into said looped field coil, and means for securing said field coil and damping box to the base plate so that either can be removed independent of the other.

11. In a current measuring instrument, the combination of a base plate, a looped field coil secured to said base plate in upright edgewise position, and a damping box secured to the base plate at one side of said looped field coil with a lateral portion of itself projecting into said looped field coil, said field coil and damping box being each removable from the base plate independent of the other.

12. In a current measuring instrument, the combination of a base plate, a field coil in the form of a rectangular loop secured to said base plate in upright edgewise position, and a cylindrical damping box secured to said base plate with its longitudinal axial line perpendicular thereto and one side portion of itself projecting into said looped field coil, said damping box and field coil being independently secured to the base plate and independently removable therefrom.

IVAR W. BROGGER.